(12) United States Patent
Fan et al.

(10) Patent No.: US 11,045,806 B2
(45) Date of Patent: Jun. 29, 2021

(54) INTEGRATED TYPE MICROFLUIDIC ELECTROCHEMICAL BIOSENSOR SYSTEM AND METHOD FOR RAPID BIOCHEMICAL ANALYSIS

(71) Applicant: HANGZHOU JINCHENGYIBANG TECHNOLOGY CO. LTD, Hangzhou (CN)

(72) Inventors: Chunhai Fan, Shanghai (CN); Fan Yang, Shanghai (CN); Xiaolei Zuo, Shanghai (CN); Qing Huang, Shanghai (CN)

(73) Assignee: HANGZHOU JINCHENGYIBANG TECHNOLOGY CO. LTD, Hangzhou (CN)

( * ) Notice: Subject to any disclaimer, the term of this patent is extended or adjusted under 35 U.S.C. 154(b) by 0 days.

(21) Appl. No.: 16/894,984

(22) Filed: Jun. 8, 2020

(65) Prior Publication Data

US 2020/0298237 A1    Sep. 24, 2020

Related U.S. Application Data

(63) Continuation of application No. 14/558,058, filed on Dec. 2, 2014, now abandoned.

(30) Foreign Application Priority Data

Dec. 2, 2013    (CN) .......................... 201310638228.9

(51) Int. Cl.
*B01L 3/00* (2006.01)
*B29C 65/02* (2006.01)
(Continued)

(52) U.S. Cl.
CPC . *B01L 3/502784* (2013.01); *B01L 2200/0673* (2013.01); *B01L 2200/0689* (2013.01);
(Continued)

(58) Field of Classification Search
CPC ....... B01L 3/502784; B01L 2300/0645; B01L 2300/0816; B01L 2300/0887;
(Continued)

(56) References Cited

U.S. PATENT DOCUMENTS 6,803,228 B1    10/2004 Caillat et al.
6,942,778 B1 *   9/2005 Jalali ...................... B01D 57/02
                                                            204/601
(Continued)

FOREIGN PATENT DOCUMENTS

CN          1726007        1/2006
CN        102162807        8/2011
(Continued)

OTHER PUBLICATIONS

Curtis D Chin "Microfluidics-based diagnostics of infectious diseases in the developing world" nature medicine vol. 17 | No. 8 | Aug. 2011 (Year: 2011).*

(Continued)

*Primary Examiner* — Michael Y Sun
(74) *Attorney, Agent, or Firm* — Hamre, Schumann, Mueller & Larson, P.C.

(57) ABSTRACT

The present invention provides an integrated type microfluidic electrochemical biosensor system for rapid biochemical analysis and the usage of the system. The system comprising: a continuous feeding unit for sequentially conveying lead eluent, sample solution, sample eluent, signal probe solution, signal probe eluent and electrochemical detection buffer solution; a microfluidic chip consists of one or more micro-channel network, the microfluidic chip covers the electrode array to form a channel system, capture probes which have interaction with the said sample solution fixed on the surface of the electrode array, said channel system is connected with the continuous feed unit; and a power system (Continued)

for providing power to said continuous feeding unit. The invention innovatively combine three technologies of planar electrode arrays, microfluidic chip technology and continuous feeding unit together, and the integrated type microfluidic electrochemical biosensing system which is small in size and low in cost and has a wide application prospect is provided.

7 Claims, 5 Drawing Sheets

(51) Int. Cl.
| | | |
|---|---|---|
| B29L 31/00 | (2006.01) | |
| B29C 65/00 | (2006.01) | |
| G01N 27/447 | (2006.01) | |
| G01N 35/08 | (2006.01) | |

(52) U.S. Cl.
CPC ... *B01L 2200/12* (2013.01); *B01L 2300/0636* (2013.01); *B01L 2300/0645* (2013.01); *B01L 2300/087* (2013.01); *B01L 2300/0816* (2013.01); *B01L 2300/0825* (2013.01); *B01L 2300/0887* (2013.01); *B01L 2400/049* (2013.01); *B29C 65/02* (2013.01); *B29C 66/028* (2013.01); *B29C 66/112* (2013.01); *B29C 66/114* (2013.01); *B29C 66/1122* (2013.01); *B29C 66/53461* (2013.01); *B29C 66/71* (2013.01); *B29C 66/919* (2013.01); *B29C 66/949* (2013.01); *B29L 2031/756* (2013.01); *G01N 27/44713* (2013.01); *G01N 27/44791* (2013.01); *G01N 35/08* (2013.01)

(58) Field of Classification Search
CPC .......... B01L 2400/049; B01L 2200/12; B01L 2300/087; B01L 2200/0673; B01L 2300/0636; B01L 2200/0689; B01L 2300/0825; G01N 27/44791; G01N 27/44713; G01N 35/08; B29C 66/949; B29C 66/71; B29C 66/112; B29C 66/028; B29C 66/919; B29C 66/1122; B29C 65/02; B29C 66/53461; B29C 66/114; B29L 2031/756

See application file for complete search history.

(56) References Cited

U.S. PATENT DOCUMENTS

| | | | | |
|---|---|---|---|---|
| 2007/0269883 | A1* | 11/2007 | Uhrich | B82Y 40/00 |
| | | | | 435/287.2 |
| 2011/0243790 | A1* | 10/2011 | Cheung | G01N 33/56977 |
| | | | | 422/52 |

FOREIGN PATENT DOCUMENTS

| | | |
|---|---|---|
| CN | 102296028 | 12/2011 |
| CN | 103182334 | 7/2013 |

OTHER PUBLICATIONS

Sirley V. Pereira "A microfluidic device based on a screen-printed carbon electrode with electrodeposited gold nanoparticles for the detection of IgGanti-Trypanosoma cruzi antibodies" Analyst, 2011, 136, 4745 (Year: 2011).*

B.V. Chikkaveeraiah et al., "Microfluidic electrochemical immunoarray for ultrasensitive detection of two cancer biomarker proteins in serum," Biosensors and Bioelectronics, vol. 26 (2011), p. 4477-4483.

C.D. Chin et al., "Microfluidics-based diagnostics of infectious diseases in the developing world," Nature Medicine, vol. 17, No. 8 (2011), p. 1015-1019.

P. B. Lillihoj et al., "A self-pumping lab-on-a-chip for rapid detection of botulinum toxin," Lab Chip, vol. 10 (2010), p. 2265-2270.

J.S. Swensen et al., "Continuous, Real-Time Monitoring of Cocaine in Undiluted Blood Serum via a Microfluidic, Electrochemical Aptamer-Based Sensor," J. Am. Chem. Soc., vol. 131 (2009), p. 4262-4266.

Curtis D Chinm, "Microfluidics-based diagnostics of infectious diseases in the developing world", Nature Medicine, vol. 17, No. 8, Aug. 2011.

Sirley V. Pereira, "A microfluidic device based on a screen-printed carbon electrode withelectrodeposited gold nanoparticles for the detection of IgGanti-Trypanosoma cruzi antibodies", Analyst, 2011, 136, 4745.

* cited by examiner

INTEGRATED TYPE MICROFLUIDIC ELECTROCHEMICAL BIOSENSOR SYSTEM AND METHOD FOR RAPID BIOCHEMICAL ANALYSIS

TECHNICAL FIELD

The present invention relates to a microfluidic electrochemical biosensor systems, and more particularly relates to an integrated type microfluidic electrochemical biosensor system and method for rapid biochemical analysis.

BACKGROUND

The electrochemical biosensor is an apparatus using the specific which is particular to biochemical reactions to selectively identify a particular substance to be detected and converting the biochemical reaction into electrical signal output. Electrochemical detection method itself has some unique advantages, including: rapid detection, high sensitivity, high selectivity, simple instrumentation, easy miniaturization, integration, low power consumption, and suitable for field testing. However, the traditional three-electrode system, such as carbon electrodes and gold electrodes and so on, not only throughput is low, the cost is also higher. It is difficult to meet the high-throughput and low-cost testing requirements at the present stage. Recently, the rapid development of printing technology and lithography greatly contributed to the development of high-throughput and disposable electrodes, but the long time sample incubating and time consuming, tedious cleaning steps limit the further application of such electrochemical biosensor. Microfluidic chip technology can effectively solve the above problems.

Microfluidic chip analysis is based on analytical chemistry and biochemistry and relied on MEMS processing technology, characterized by micro-channel network structure. The parts of the collection of the sample, pretreatment, separation, reaction, detection and the like are integrated type within the scope of a few square centimeters to complete the processing and testing of samples fast and efficiently. Because the micro-channel depth, width are in the micron level, it can be effective to limit the target to be detected and the capture probes which have fixed sensor interface in the scope of micrometer scales for interaction, greatly increases the ability to identify molecules.

Rapid molecular recognition of the electrode surface is the foundation of efficient scene electrochemical biosensing. Soh, et al. (Swensen, J. S.; Xiao, Y.; Ferguson, B. S.; Lubin, A. A.; Lai, R. Y.; Heeger, A. J.; Plaxco, K. W.; Soh, H. T., Continuous, Real-Time Monitoring of Cocaine in Undiluted Blood Serum via a Microfluidic, Electrochemical Aptamer-Based Sensor. JACS, 2009, 131, 4262-4266) prepared flat gold electrode by lithography, constructed microfluidic E-DNA sensor. However, the cost of preparation of the electrode lithography is too high, the mass production is difficult. In addition, Rusling et al. (Chikkaveeraiah, B. V.; Mani, V.; Patel, V.; Gutkind, J. S.; Rusling, J. F., Microfluidic electrochemical immunoarray for ultrasensitive detection of two cancer biomarker proteins in serum. Biosens. Bioelectron, 2011, 26, 4477-4483) using a printing electrode array and a microchannel structure to fix machine screws and plexiglass clamps to seal the sensor chip reversibly. Although a super-sensitive markers detection is achieved, each time the sample tests need to re-assemble and disassemble sensors and insert counter electrode and reference electrode along the microchannel repeatedly. The workload is heavy and tedious. Although there are reports of a single-electrode microfluidic electrochemical sensor drived by capillary force, but the force can not complete delivery of various solutions and is difficult to carry out multivariate detection (Lillehoj, P. B.; Wei, F.; Ho, C.-M., A self-pumping lab-on-a-chip for rapid detection of botulinum toxin. Lab Chip, 2010, 10, 2265-2270). How to achieve efficient molecular recognition and complete delivery of a variety of solution rapidly remains a serious challenge. Recently, Sia, et al. (Chin, C. D.; Laksanasopin, T.; Cheung, Y. K.; Steinmiller, D.; Linder, V.; Parsa, H.; Wang, J.; Moore, H.; Rouse, R.; Umviligihozo, G.; Karita, E.; Mwambarangwe, L.; Braunstein, S. L.; van de Wijgert, J.; Sahabo, R.; Justman, J. E.; El-Sadr, W.; Sia, S. K., Microfluidics-based diagnostics of infectious diseases in the developing world. Nat. Med., 2011, 17, 1015-1019) completed rapid detection of infectious diseases by introducing gas interval solution zone and a microfluidic chip, but the method is mainly carried out by introducing enhanced signal to analyze the disease qualitatively, the clinical and field testing need for more quantitative analysis of disease markers.

SUMMARY OF THE INVENTION

The object of the present invention is to provide an integrated type microfluidic electrochemical biosensor system and method for rapid biochemical analysis, so as to solve defect that the prior art fails to quickly complete delivery of various solutions, microfluidic chip's micro channel network layer and the electrode array layer is fixed by a auxiliary equipment, and the defect that can not achieve quantitative analysis of disease markers, and electrochemical biosensor system of the prior art is restricted to planar electrode array prepared by lithographic techniques, resulting in the problem of high cost.

To solve the above problems, the present invention employs the following technical solutions.

The present invention provides an integrated type biochemical microfluidic electrochemical biosensor system for rapid biochemical analysis, comprising: a continuous feeding unit for sequentially conveying lead eluent, sample solution, sample eluent, signal probe solution, signal probe eluent and electrochemical detection buffer solution; a microfluidic chip consists of one or more micro-channel network, the microfluidic chip covers the electrode array to form a channel system, capture probes which have interaction with the said sample solution fixed on the surface of the electrode array, said channel system is connected with the continuous feed unit; and a power system for providing power to said continuous feeding unit.

Under the action of the power system, said continuous feeding unit sequentially conveying lead eluent, sample solution, sample eluent, signal probe solution, signal probe eluent and electrochemical detection buffer solution into said microfluidic chip's micro-channel network and interacting with the capture probe fixed on the surface of the electrode array, generating an signal detectable by electrochemical device, reading out electrochemical signal of the electrode array surface modified by different capture probes once.

The microfluidic chip and electrode array formed no-leakage reversible or irreversible channel system by plasma cleaning and heat bonding process.

The condition of the heat bonding process is heated above 37° C. for more than 30 minutes.

The electrode array is a carbon electrode array or gold electrode array prepared by the screen printing technique, or an electrode array produced by directly depositing nano metal particles on the surface of the carbon electrode electrochemical deposition of the electrode array or the nano metal, or a planar electrode array produced by photolithography technique.

The capture probes fixed on the surface of the electrode array include antibodies, antigens, nucleic acids or nucleic acid aptamers.

The continuous feeding unit is consists of small tube which have through channel, and said lead eluent, sample solution, sample eluent, signal probe solution, signal probe eluent and electrochemical detection buffer solution spaced by the air bubble continuously went through the through channel into the micro-channel network of said microfluidic chip.

The power system is consists of the injection pump or injector connecting the downstream of the microfluidic chip and provide vacuum negative pressure as the fluid driving force to achieve the automatic transfer of solutions with different functions of within the continuous feeding unit.

The invention also provides an usage of an integrated type microfluidic electrochemical biosensor system for rapid biochemical analysis, comprising: providing a microfluidic electrochemical biosensor system as described above; connecting the power system to the downstream of the microfluidic chip, sequentially conveying lead eluent, sample solution, sample eluent, signal probe solution, signal probe eluent and electrochemical detection buffer solution into said microfluidic chip's micro-channel network by said continuous feeding unit and interacting with the capture probe fixed on the surface of the electrode array, achieving continuous capture and cleaning, generating a detectable electrochemical signal quickly, reading out electrochemical signal of the electrode array surface modified by different capture probes once by electrochemical workstation.

The lead eluent, the sample solution, the sample eluate, the signal probe solution, signal probe elution, and the electrochemical detection buffer solution sequentially spaced by air bubbles with length of 0.5 cm or more to prevent cross-contamination.

The power system is consists of the injection pump or injector connecting the downstream of the microfluidic chip, and said injection pump or injector connect to the outlet end of said microfluidic chip by a period of small rubber tube which have strong deformability to form a vacuum negative pressure system.

The invention innovatively combine three technologies of planar electrode arrays, microfluidic chip technology and continuous feeding unit together to form a micro-scale sensing method for simultaneous detecting multiple disease markers. Electrochemical analysis and microfluidic chip is actually belong to two different study fields. Electrochemical analysis field emphasis on the interface design and regulation of electrode, not much on manipulation, continuous feeding or continuous cleaning and other aspects of the sample. The field of microfluidics stressed controllable manipulation of fluid and micro-channel chip design to match or meet the appropriate means of detection. Although integrated type electrochemical detection microfluidic chip has long been reported, but more concentrated in a glass or silicon substrate photolithography planar microelectrodes. The main reason for this is the photolithography planar microelectrodes can match the micro-channel chip, and easy bonding. But the cost of using such photolithography to prepare electrode is high, it is difficult to mass production. In addition, these integrated type electrochemical detection microfluidic chips mainly cumbersome feeding and cleaning by capillary force or power provided by the micro-pump. And the present application is applicable not only to the electrode array has been successfully commercialized as a macroscopic printed electrode of plastic substrate, but also extends to the plane macro-electrode prepared by the photolithography technique. We successfully combine the printed electrodes which have infinite market with a new microfluidic technologies and integrated type disposable continuous feeding unit, with significant innovation and application prospects.

The invention is advantageous over the prior art has the following effects:

I) can convey a variety of solution once quickly, to flow through micro-scale sensor interface continuously, in order to improve the efficiency of molecular recognition, operate easily, fast, greatly simplify the procedure of electrochemical biosensors;

2) the micro-channel network of the microfluidic chip and the electrode array layer achieved no-leakage seal by processing, do not need any auxiliary equipment which is used to fix, reducing the difficulty of preparing the device, increasing the reproducibility and stability of preparation.

3) can achieved quantitative detection with different concentrations of a variety of different target, less reagent consumption, rapid analysis;

4) an integrated type microfluidic electrochemical biosensing system which is small in size and low in cost and has a wide application prospect is provided.

EMBODIMENT

The following Examples with reference to specific embodiments, the present invention is further described below. It should be understood, the following examples only illustrate the present invention and not for limiting the scope of the invention.

Figure 1:
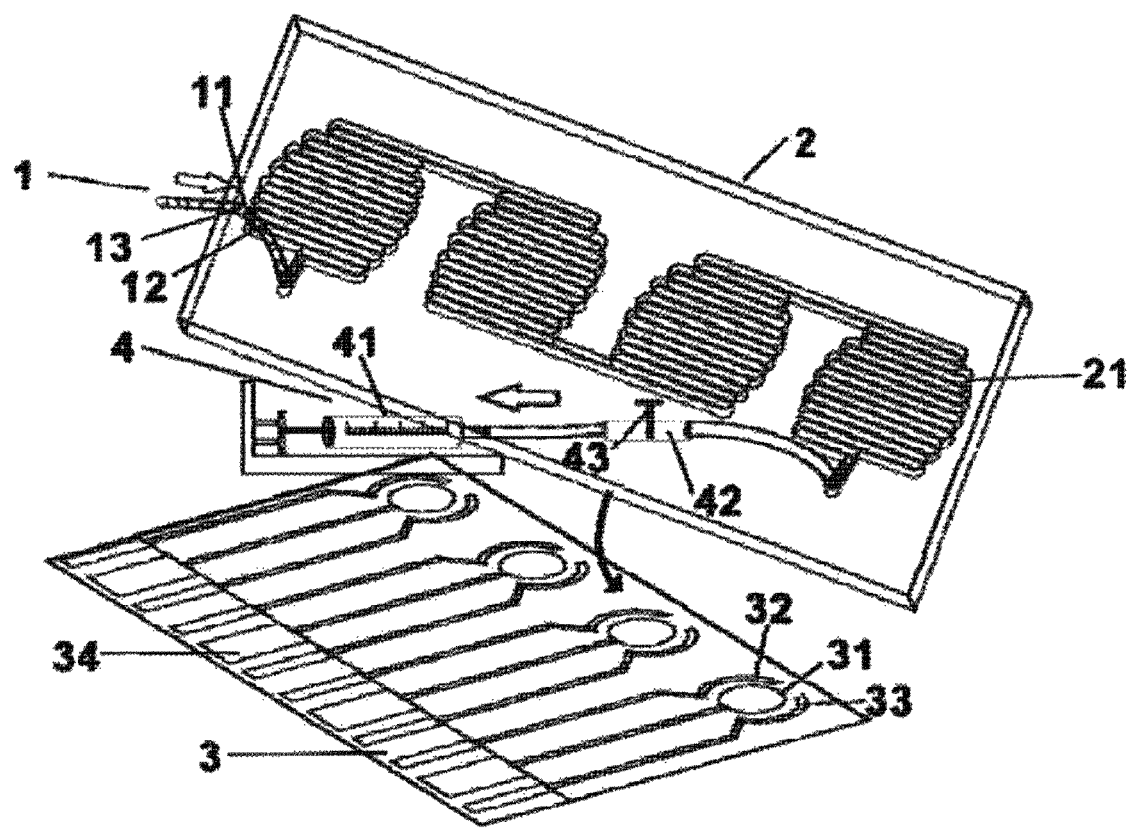
FIG. 1 is a perspective diagram illustrating the structure of a microfluidic electrochemical biosensor system according to a preferred embodiment of the present invention.
Figure 2:
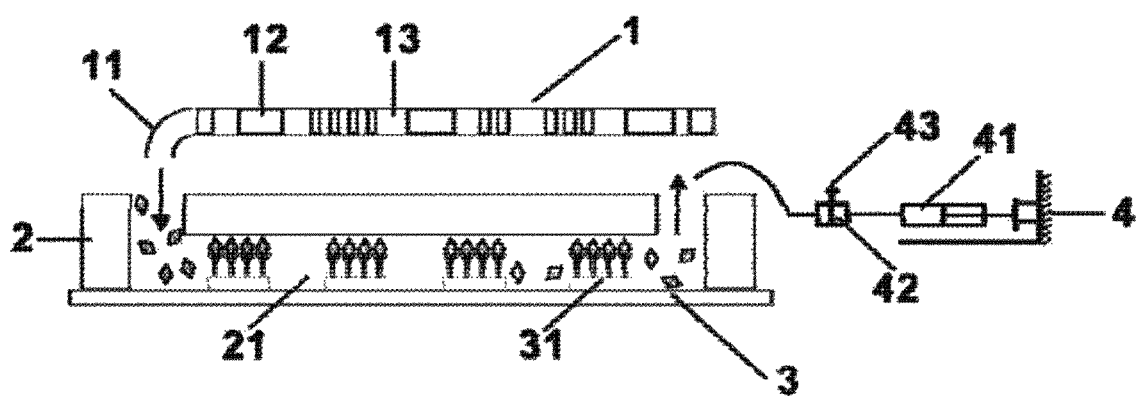
FIG. 2 is a sectional view of a microfluidic electrochemical biosensor system which is shown in FIG. 1.

As shown in FIG. 1-FIG. 2, a microfluidic electrochemical biosensor system according to a preferred embodiment of the present invention comprising: a continuous feeding unit 1 for the convey solution of different function, a microfluidic chip 2 consisting of four micro-channel network 21, an electrode array 3 covered by said microfluidic chip 2, a power system 4 is connected with the downstream of the microfluidic chip 2.

The continuous feeding unit 1 is formed of a transparent plastic small tube 11 to provide a through passage for the solution of different function sequentially to go through the passage into the micro-channel network 21 of the network 2, solution of different function is spaced by air bubble 13 to form different functional solution zones 12. Preferably, the length of the air bubbles 13 is to be maintained at more than 0.5 cm to prevent the former solution and later solution from mixing to form a cross-contamination in the feeding and loading procedure due to extrusion of air bubble 13 or discontinuous dispersion of solution caused by rapid changes in pressure.

Figure 3:
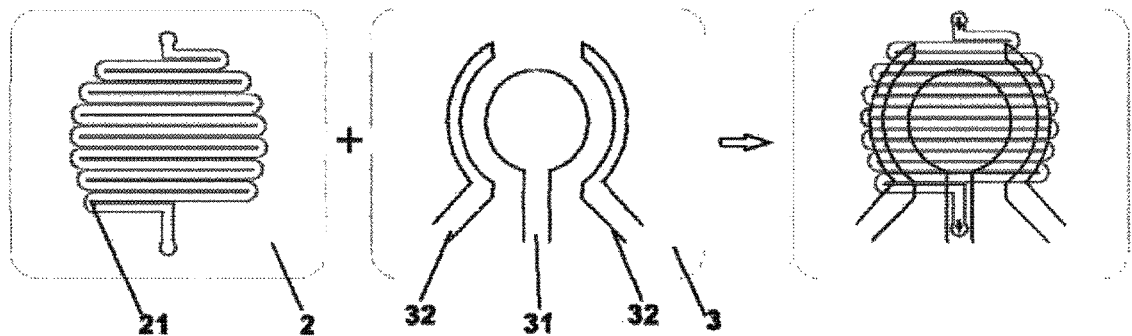
FIG. 3 is a schematic diagram of the process based on the formation of a single three-electrode system microfluidic biosensor.
Figure 4:
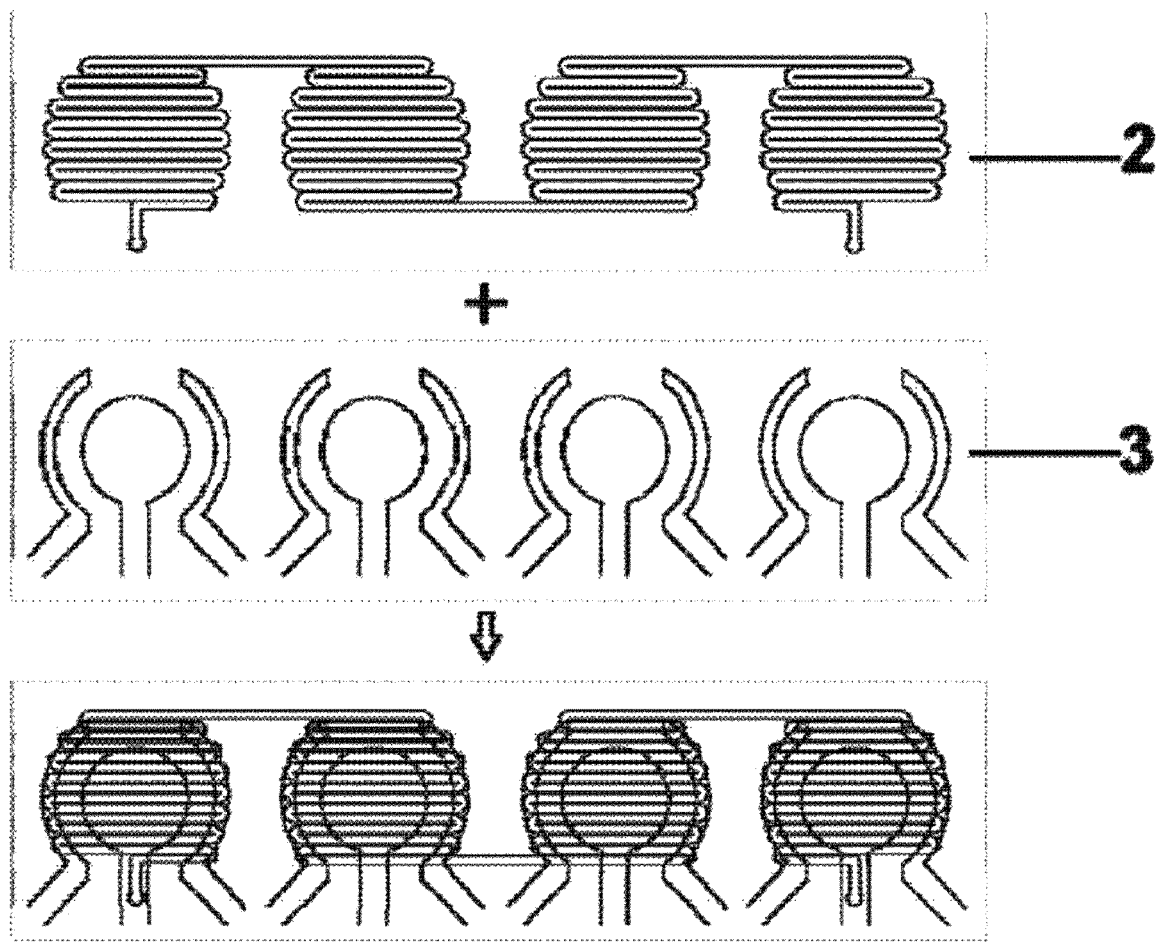
FIG. 4 is a schematic diagram of the process based on the formation of four three-electrode system microfluidic biosensors.
Figure 5:
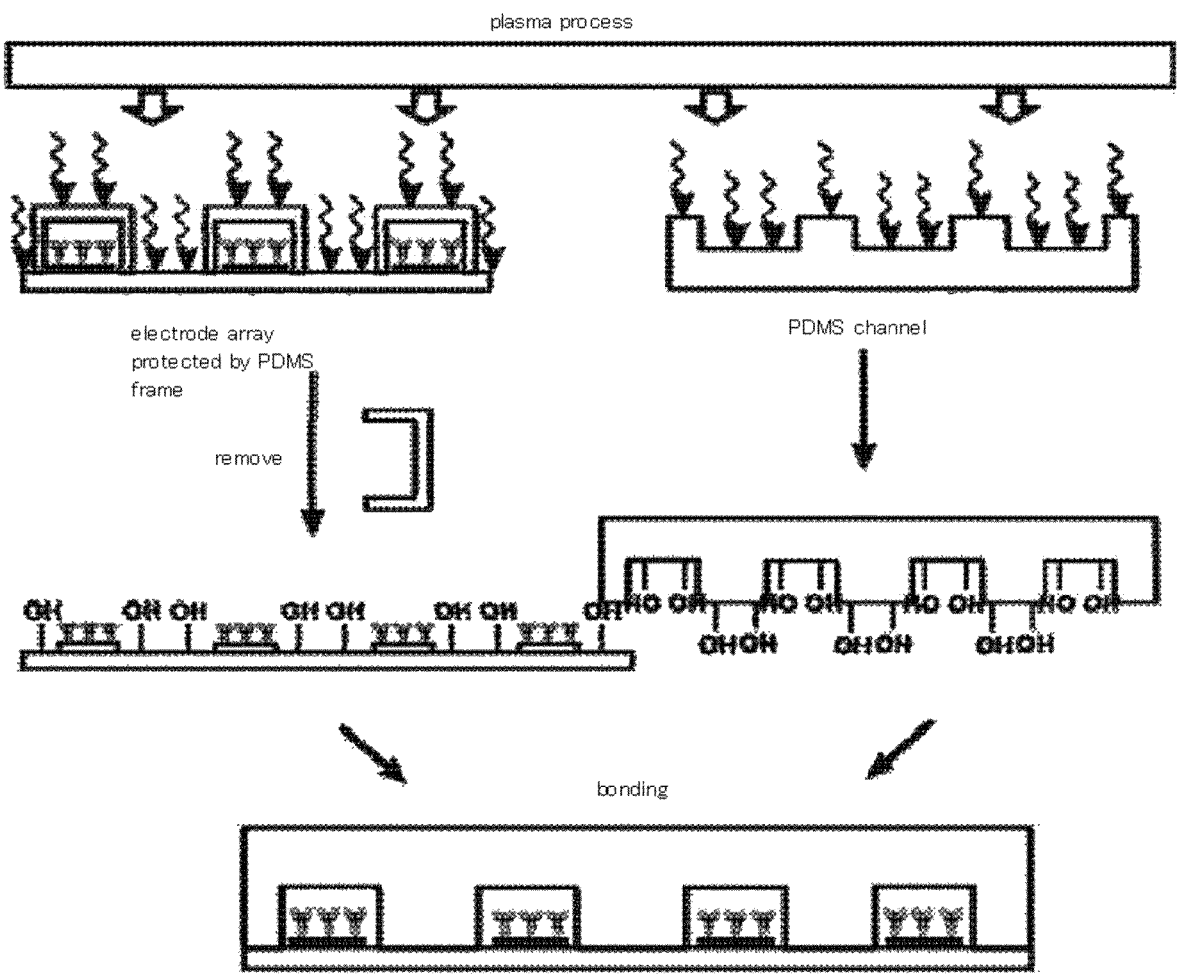
FIG. 5 is a schematic diagram of the surface process and bonding procedure of the microfluidic electrochemical biosensor based on printed electrode array and the polydimethylsiloxane micro-channel.

Referring to FIG. 3-FIG. 4, preferably, the microfluidic chip 2 is made of four serpentine micro-channel network 21, the electrode array 3 is composed of an four three-electrode system printed electrode. The four electrode are working electrode 31, counter electrode 32, reference electrode 33, and a printed electrode silver wire 34 (see FIG. 1). FIG. 5 shows the surface process and bonding procedure of the microfluidic chip 2 and the electrode array 3. First, the microfluidic chip 2 network 21 comprising the micro-channel network 2 (made of polydimethylsiloxane (PDMS)) and the electrode array 3 optionally protected by PDMS frame are processed by plasma. After that, PDMS frame which have surface antibody activity and protect the electrode array is removed so that PDMS channel layer and the electrode array layer are aligned and thermal bonding. Since the surface of the chip and the surface of the electrode array are produced by plasma treatment, a large number of oxygen-containing functional groups are formed. Oxygen-containing groups in the interface cross-linking react to produce irreversible chip bonding, so that the microfluidic chip and the electrode array can form a no leakage reversible or irreversible system without machine screws and the upper and lower splints and any outside force. Preferably, the condition of the heat bonding process is preferably heated above 37° C. for 30 min.

The power system 4, as a power source of continuous feeding unit 1, is connected with the downstream of the microfluidic chip 2. The preferred embodiment use disposable syringe 41. When using the syringe by pulling the push handle 41 to a certain height and then fixed by wooden strips or metal rods to form vacuum negative pressure in the whole flow channel. The negative pressure used as the driving force of the fluid so as to realize an automatic transfer of various functional solution zones 12 in the continuous feeding unit 1. In order to ensure the smooth formation of vacuum negative pressure, the syringe 41 is connected with the outlet end of microfluidic chip 2 through a period of a piston rubber small tube 42 which has strong deformation and matching diameter. The piston rubber small tube 42 is designed with adjustable valve 43 to control the opening and closing of the whole flow channel. Syringe 41 and the rubber small tube 42, also the rubber small tube 42 and the outlet end of the microfluidic chip 2 is further connected through a suitable small pipe.

Example 1

Figure 6A:
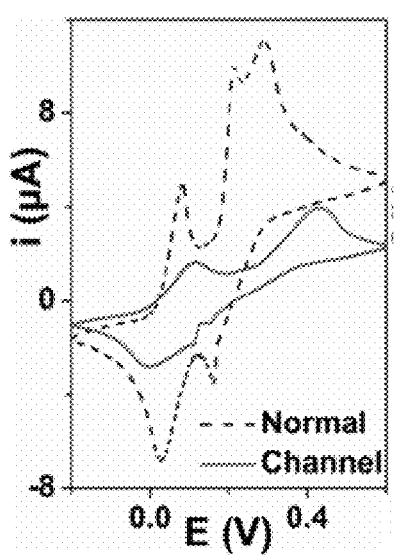
FIGS. 6A and 6B are comparison chart for bonding single three-electrode system and the micro-channel network of the microfluidic chip to detect 500 ng/mLPSA current.

This embodiment use a microfluidic electrochemical biosensor (FIG. 3) formed before and after the bonding of a single three-electrode unit and the micro-channel network to detect human prostate cancer marker PSA. Specific steps are as follows: A 20 μL TMB solution (3,3',5,5'-tetramethylbenzidine hydrochloride) were added to the surface of three-electrode (Normal) and micro-channels covered by PDMS (Channel), then the electrode connect to the electrochemical workstation to do the cyclic voltammetry test and obtain the experiment results in FIG. 6A.

Figure 6B:
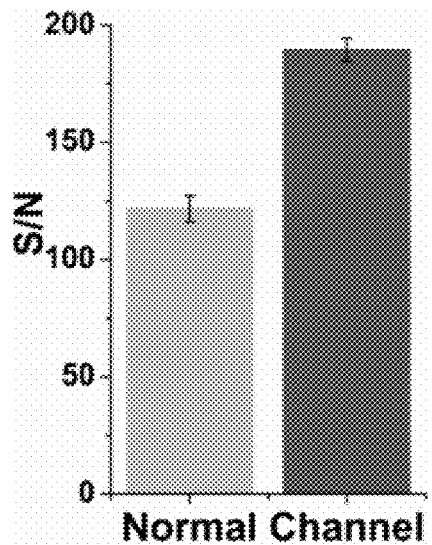

We use 1 mL syringe to continuous manual extract horseradish peroxidase-conjugated avidin (avidin-HRP), water, buffer solution (0.01M phosphate, 0.14M NaCl, 2.7 mM KCl, pH7.2), the biotin-labeled PSA (biotin-PSA) and 500 ng/mL PSA solution zone, there are air bubbles which have 0.5-1 cm length between the solution zone interval, where the volume of each solution zone is 1-20 μL; connect the prepared microfluidic chip, continuous feeding unit, the power system into an entirety, injection pump extraction flow rate was adjusted to 1-20 μL/min, when the solution area in the continuous feeding unit to be seen began to flow to the microfluidic chip, pausing the extraction to quickly adjust the flow rate to 2-5 μL/min. During the continuous flowing process of the solution zone, the PSA-Ab (monoclonal antibodies) fixed on the electrode interface successively binding 500 ng/mL PSA, 10-20 μg/mL biotin-labeled second antibody biotin-PSA in the sample zone to form the sandwich structure and couple with the avidin-HRP in the signal probe solution zone. After use the buffer solution and water to wash off unbound probe complex, directly dropping 10 μL TMB solution in the inlet without power injection, the electrode is connected with an electrochemical workstation to do the amperometric detection, HRP enzyme catalyze $H_2O_2$ in the TMB solution to amplify electrochemical signal circularly to obtain the experimental results of FIG. 6B.

Example 2

Figure 7:
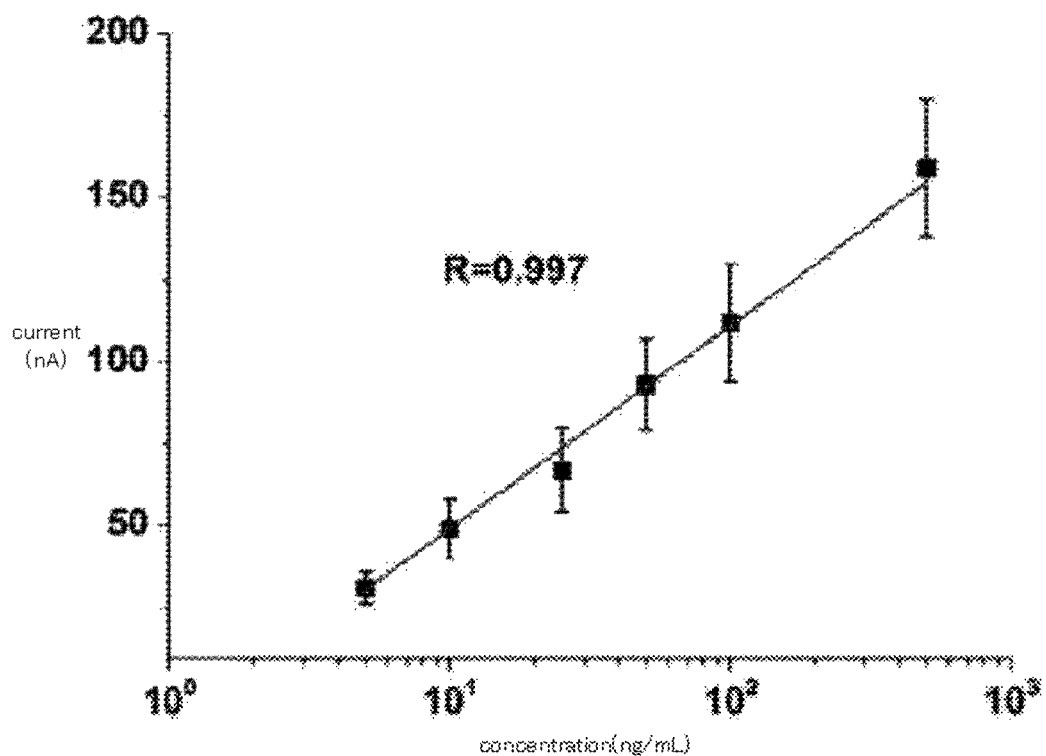
FIG. 7 is a result chart for split vaccine of human influenza virus H1N1 is detected in the single three-electrode microfluidic electrochemical biosensor detection system.

This embodiment also use a microfluidic electrochemical biosensor (FIG. 3) formed before and after the bonding of a single three-electrode unit and the micro-channel network to detect split vaccine of human influenza viruses H1N1. Steps are as follows: use 1 mL syringe to continuous manual extract H1N1-HRP, water, buffer solution (0.01M phosphate, 0.14M NaCl, 2.7 mM KCl, pH7.2), and H1N1 split vaccine solution zone of a certain concentration, there are air bubbles which have 0.5-1 cm length between the solution zone interval, where the volume of each solution zone is 1-20 μL; connect the prepared microfluidic chip, continuous feeding unit, the power system into an entirety, injection pump extraction flow rate was adjusted to 1-20 μL/min, when the solution area in the continuous feeding unit to be seen began to flow to the microfluidic chip, pausing the extraction to quickly adjust the flow rate to 2-5 μL/min. During the continuous flowing process of the solution zone, the H1N1-77 (H1N1 antibodies) fixed on the electrode interface successively binding 0-500 ng/mL H1N1, 10 μg/mL HRP-labeled second antibody HRP-H1N1 (probe solution) in the sample zone to form the sandwich structure. After use the buffer solution and water to wash off unbound probe complex, directly dropping 10 μL TMB solution in the inlet without power injection, the electrode is connected with an electrochemical workstation to do the amperometric detection, HRP enzyme catalyze $H_2O_2$ in the TMB solution to amplify electrochemical signal circularly to obtain the experimental results of FIG. 7.

Example 3

Figure 8:
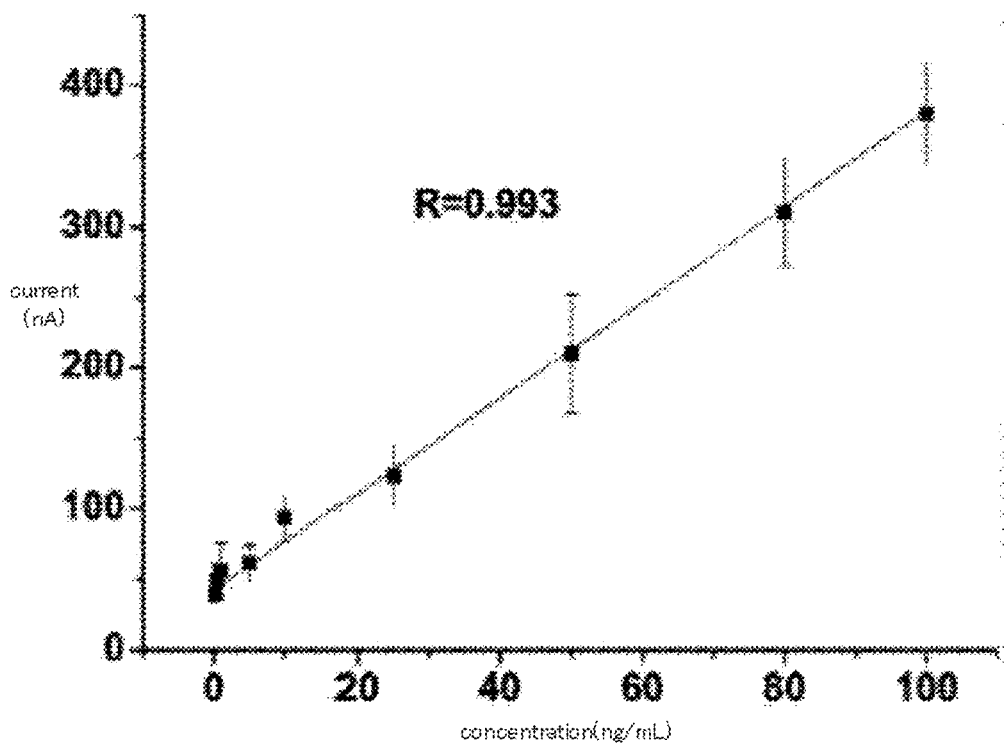
FIG. 8 is a result chart for human prostate cancer marker PSA of different concentration is detected in the microfluidic electrochemical biosensor system shown in FIG. 1.
Figure 9:
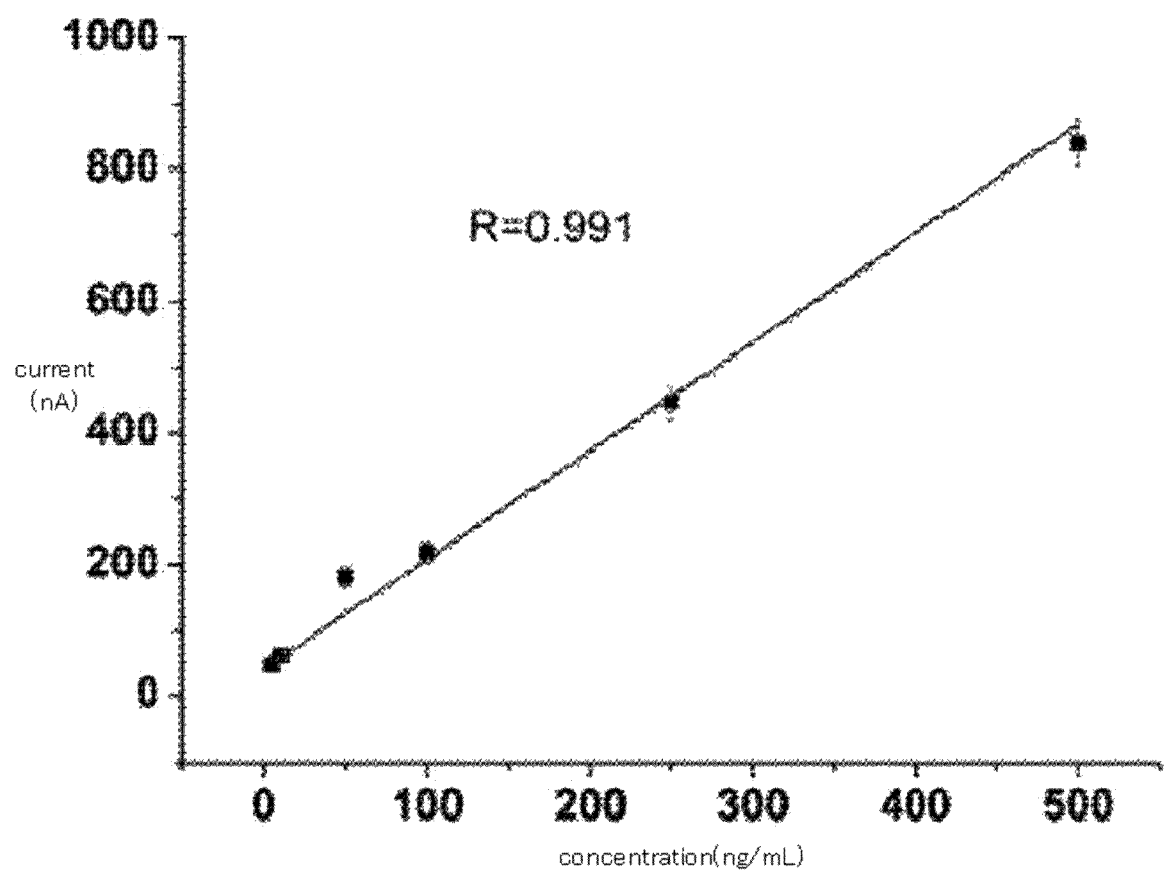
FIG. 9 is a result chart for human liver cancer marker AFP of different concentration is detected in the microfluidic electrochemical biosensor system shown in FIG. 1.

This embodiment use a microfluidic electrochemical biosensor (FIG. 4) consists of the bonding of four three-electrode units and the micro-channel network to detect human prostate cancer marker PSA and human liver cancer marker AFP simultaneously. Steps are as follows: use 1 mL syringe to continuous manual extract avidin-HRP, water, buffer solution (0.01M phosphate, 0.14M NaCl, 2.7 mM KCl, pH7.2), mixture of biotin-PSA and biotin-AFP, and PSA and AFP antigen mixture solution zone of a certain concentration, there are air bubbles which have 0.5-1 cm length between the solution zone interval, where the volume of each solution zone is 1-20 µL; connect the prepared microfluidic chip, continuous feeding unit, the power system into an entirety, injection pump extraction flow rate was adjusted to 1-20 µL/min, when the solution area in the continuous feeding unit to be seen began to flow to the microfluidic chip, pausing the extraction to quickly adjust the flow rate to 2-5 µL/min. During the continuous flowing process of the solution zone, the PSA-Ab and AFP-Ab (monoclonal antibodies) fixed on the electrode interface successively binding 0-100 ng/mL PSA and 0-500 ng/mL AFP, 10-20 µg/mL biotin-labeled second antibody biotin-PSA and 12.5-25 µg/mL biotin-labeled second antibody biotin-AFP in the sample zone to form the sandwich structure and couple with the avidin-HRP in the signal probe solution zone. After use the buffer solution and water to wash off unbound probe complex, directly dropping 20 µL TMB solution in the inlet without power injection, the electrode is connected with an electrochemical workstation to do the amperometric detection, HRP enzyme catalyze $H_2O_2$ in the TMB solution to amplify electrochemical signal circularly to obtain the experimental results of FIG. 8 and FIG. 9.

The above description is only the preferred embodiment of the present invention, not intended to limit the scope of the present invention. Various changes may be made to the above-described embodiments of the present invention. All of the simple, equivalent change and modification according based on the claims of present application and specification content will fall into the scope of protection required by the claims of patent. The contents which are not detail in the present invention are all conventional technical contents.

The invention claimed is:

1. A method for preparing an integrated type microfluidic electrochemical biosensor system for rapid biochemical analysis, the integrated type microfluidic electrochemical biosensor system comprising:
   a continuous feeding unit, wherein the continuous feeding unit sequentially transports a lead eluent, a sample solution, a sample eluent, a signal probe solution, a signal probe eluent, and an electrochemical detection buffer solution;
   a biosensor including a microfluidic chip and an electrode array, wherein the microfluidic chip has one or more micro-channel networks; and
   a power system for providing power to the continuous feeding unit,
   the method comprising:
   fixing a capture probe on a surface of the electrode array;
   covering the capture probe fixed on the surface with a polydimethylsiloxane frame;
   treating the microfluidic chip and the electrode array with plasma;
   removing the polydimethylsiloxane frame;
   aligning the one or more micro-channel networks with the electrode array so that the one or more micro-channel networks are covered with the electrode array to form a channel system; and
   thermally bonding the microfluidic chip with the electrode array so that the microfluidic chip and the electrode array form a no leakage reversible or irreversible system without a machine screw or a splint,
   wherein the capture probe is configured to generate a detectable signal when capturing a sample as a result of being covered with a polydimethylsiloxane frame during plasma cleaning to avoid damage by plasma, and then removing the polydimethylsiloxane frame after the plasma cleaning,
   the capture probe is a biological probe,
   the capture probe has interaction with the sample solution, and
   the channel system is in fluid connection with the continuous feed unit.

2. The method according to claim 1, wherein the thermal bonding is conducted at a temperature of above 37° C. for more than 30 minutes.

3. The method according to claim 1, wherein the electrode array is a carbon electrode array or gold electrode array prepared by a screen printing technique, or an electrode array produced electrochemically by directly depositing nano metal particles on a surface of a carbon electrode, or a planar electrode array produced by a photolithography technique.

4. The method according to claim 1, wherein the continuous feeding unit includes a small tube that has a through channel, and
   the lead eluent, the sample solution, the sample eluent, the signal probe solution, the signal probe eluent, and the electrochemical detection buffer solution are spaced by air bubbles, and continuously travel through the through channel into the one or more micro-channel networks of the microfluidic chip.

5. The method according to claim 1, wherein the power system includes an injection pump or injector, the injection pump or injector is in connection with the microfluidic chip and provides a vacuum negative pressure as a fluid driving force.

6. The method according to claim 1, wherein the biosensor does not include an auxiliary equipment for holding the microfluidic chip and the electrode array together.

7. The method according to claim 1, wherein the microfluidic chip and the electrode array chemically bond each other via oxygen-containing functional groups generated by plasma at an interface thereof.

* * * * *